United States Patent
Rathore et al.

(10) Patent No.: US 10,066,123 B2
(45) Date of Patent: Sep. 4, 2018

(54) CURABLE SILSESQUIOXANE POLYMERS, COMPOSITIONS, ARTICLES, AND METHODS

(71) Applicant: 3M INNOVATIVE PROPERTIES COMPANY, St. Paul, MN (US)

(72) Inventors: Jitendra S. Rathore, Woodbury, MN (US); Babu N. Gaddam, Woodbury, MN (US); Mieczyslaw H. Mazurek, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 64 days.

(21) Appl. No.: 15/102,809

(22) PCT Filed: Dec. 8, 2014

(86) PCT No.: PCT/US2014/068982
§ 371 (c)(1),
(2) Date: Jun. 8, 2016

(87) PCT Pub. No.: WO2015/088932
PCT Pub. Date: Jun. 18, 2015

(65) Prior Publication Data
US 2016/0319156 A1    Nov. 3, 2016

Related U.S. Application Data

(60) Provisional application No. 61/913,568, filed on Dec. 9, 2013, provisional application No. 62/014,735, filed on Jun. 20, 2014.

(51) Int. Cl.
*C08G 77/20* (2006.01)
*C09D 183/04* (2006.01)
(Continued)

(52) U.S. Cl.
CPC ......... *C09D 183/04* (2013.01); *C08G 77/045* (2013.01); *C08G 77/20* (2013.01); *C08G 77/12* (2013.01)

(58) Field of Classification Search
None
See application file for complete search history.

(56) References Cited

U.S. PATENT DOCUMENTS 3,775,452 A    11/1973    Karstedt
4,351,875 A    9/1982    Arkens
(Continued)

FOREIGN PATENT DOCUMENTS

CN    1827668    9/2006
CN    1887921    1/2007
(Continued)

OTHER PUBLICATIONS

"Norrish Reaction", Wikipedia, [Retrieved from the Internet on Jun. 12, 2014], URL <http://en.wikipedia.org/wiki/Norrish_reaction>, pp. 4.

(Continued)

*Primary Examiner* — Robert S Loewe
(74) *Attorney, Agent, or Firm* — Carolyn A. Fischer

(57) ABSTRACT

A curable silsesquioxane polymer, a composition including such polymer, an article having a layer disposed thereon that includes the curable polymer and/or the cured polymer, and a method of forming a cured coating, wherein the curable silsesquioxane polymer includes a three-dimensional branched network having the formula: wherein the oxygen atom at the * is bonded to another Si atom within the three-dimensional branched network; R is an organic group comprising an ethylenically unsaturated group; and R2 is an (Continued)

organic group that is not an ethylenically unsaturated group; $R^3$ is a non-hydrolyzable group; and n or n+m is an integer of greater than 3.

19 Claims, 1 Drawing Sheet

(51) Int. Cl.
*C08G 77/04* (2006.01)
*C08G 77/12* (2006.01)

(56) References Cited

U.S. PATENT DOCUMENTS

| | | | |
|---|---|---|---|
| 4,415,615 A | 11/1983 | Esmay | |
| 4,510,094 A | 4/1985 | Drahnak | |
| 4,530,879 A | 7/1985 | Drahnak | |
| 4,535,485 A | 8/1985 | Ashman | |
| 4,600,484 A | 7/1986 | Drahnak | |
| 4,723,978 A | 2/1988 | Clodgo | |
| 4,732,934 A | 3/1988 | Hathaway | |
| 4,761,358 A | 8/1988 | Hosoi | |
| 4,788,252 A | 11/1988 | De Boer | |
| 4,879,362 A | 11/1989 | Morgan | |
| 4,885,209 A | 12/1989 | Lindner | |
| 4,889,901 A | 12/1989 | Shama | |
| 4,948,837 A | 8/1990 | Wittmann | |
| 4,963,619 A | 10/1990 | Wittmann | |
| 4,997,260 A | 3/1991 | Honjo | |
| 5,030,699 A | 7/1991 | Motoyama | |
| 5,057,577 A | 10/1991 | Matsuo | |
| 5,073,595 A | 12/1991 | Almer | |
| 5,145,886 A | 9/1992 | Oxman | |
| 5,178,947 A | 1/1993 | Charmot | |
| 5,188,899 A | 2/1993 | Matsumoto | |
| 5,212,237 A | 5/1993 | Siol | |
| 5,219,931 A | 6/1993 | Siol | |
| 5,223,586 A | 6/1993 | Mautner | |
| 5,278,451 A | 1/1994 | Adachi | |
| 5,360,878 A | 11/1994 | Shen | |
| 5,491,203 A * | 2/1996 | Matsui | C08F 290/068 525/474 |
| 5,506,279 A | 4/1996 | Babu | |
| 5,602,221 A | 2/1997 | Bennett | |
| 5,609,925 A | 3/1997 | Camilletti | |
| 5,695,678 A | 12/1997 | Edamura | |
| 5,738,976 A * | 4/1998 | Okinoshima | G03F 7/0757 430/285.1 |
| 5,773,485 A | 6/1998 | Bennett | |
| 5,902,836 A | 5/1999 | Bennett | |
| 6,376,078 B1 | 4/2002 | Inokuchi | |
| 6,624,214 B2 | 9/2003 | Zimmer | |
| 6,627,314 B2 | 9/2003 | Matyjaszewski | |
| 6,743,510 B2 | 6/2004 | Ochiai | |
| 6,852,781 B2 | 2/2005 | Savu | |
| 6,927,301 B2 | 8/2005 | Laine | |
| 7,022,799 B2 * | 4/2006 | Dai | C08G 77/04 106/287.16 |
| 7,056,840 B2 | 6/2006 | Miller | |
| 7,081,295 B2 | 7/2006 | James | |
| 7,241,437 B2 | 7/2007 | Davidson | |
| 7,385,020 B2 | 6/2008 | Anderson | |
| 7,457,507 B2 * | 11/2008 | Kuramoto | C08G 77/42 385/141 |
| 7,488,539 B2 | 2/2009 | Kozakai | |
| 7,723,438 B2 | 5/2010 | Hedrick | |
| 7,976,585 B2 | 7/2011 | Cremer | |
| 7,985,523 B2 | 7/2011 | Zhou | |
| 8,012,583 B2 | 9/2011 | Wu | |
| 8,071,132 B2 | 12/2011 | Adair | |
| 8,084,177 B2 | 12/2011 | Zhou | |
| 8,168,357 B2 | 5/2012 | Wu | |
| 8,173,342 B2 | 5/2012 | Wu | |
| 8,323,803 B2 | 12/2012 | Wu | |
| 8,329,301 B2 | 12/2012 | Wu | |
| 8,431,220 B2 | 4/2013 | Wu | |
| 8,758,854 B2 | 6/2014 | Ishii | |
| 2003/0234458 A1 * | 12/2003 | Gardner | G02B 1/046 264/1.24 |
| 2004/0166077 A1 | 8/2004 | Toumi | |
| 2004/0247549 A1 | 12/2004 | Lu | |
| 2005/0025820 A1 | 2/2005 | Kester | |
| 2005/0106400 A1 * | 5/2005 | Kuramoto | C03C 17/28 428/447 |
| 2005/0215807 A1 | 9/2005 | Morimoto | |
| 2005/0256330 A1 * | 11/2005 | Okawa | C07F 7/0874 556/465 |
| 2006/0147177 A1 * | 7/2006 | Jing | C08F 2/44 385/147 |
| 2007/0073024 A1 | 3/2007 | Wariishi | |
| 2007/0134424 A1 * | 6/2007 | Tauchi | C08G 77/14 427/387 |
| 2007/0167552 A1 | 7/2007 | Stoeppelmann | |
| 2007/0213474 A1 | 9/2007 | Ebenhoch | |
| 2008/0045631 A1 | 2/2008 | Henn | |
| 2008/0057431 A1 | 3/2008 | Lai | |
| 2008/0090986 A1 * | 4/2008 | Khanarian | C08G 77/52 528/15 |
| 2008/0119120 A1 | 5/2008 | Zuniga | |
| 2008/0254077 A1 | 10/2008 | Prigent | |
| 2008/0279901 A1 | 11/2008 | Prigent | |
| 2008/0286467 A1 | 11/2008 | Allen | |
| 2009/0162650 A1 | 6/2009 | Hong | |
| 2009/0197071 A1 | 8/2009 | Cramail | |
| 2009/0215927 A1 | 8/2009 | Mohite | |
| 2009/0312457 A1 | 12/2009 | Tokumitsu | |
| 2010/0280151 A1 | 11/2010 | Nguyen | |
| 2011/0045387 A1 | 2/2011 | Allen | |
| 2011/0054074 A1 | 3/2011 | Jonschker | |
| 2011/0083887 A1 | 4/2011 | Brock | |
| 2011/0117145 A1 | 5/2011 | Inokuchi | |
| 2011/0223404 A1 | 9/2011 | Wu | |
| 2012/0132108 A1 | 5/2012 | Ishihara | |
| 2012/0205315 A1 | 8/2012 | Liu | |
| 2012/0288692 A1 | 11/2012 | Broyles | |
| 2012/0298574 A1 | 11/2012 | Kang | |
| 2013/0101934 A1 | 4/2013 | Chiba | |
| 2013/0102733 A1 | 4/2013 | Chen | |
| 2013/0139963 A1 | 6/2013 | Lee | |
| 2013/0221400 A1 * | 8/2013 | Tanikawa | H01L 23/296 257/99 |
| 2013/0318863 A1 | 12/2013 | Chang | |
| 2013/0343969 A1 | 12/2013 | Bromberg | |
| 2014/0023855 A1 | 1/2014 | Masuda | |
| 2014/0030441 A1 | 1/2014 | Nagai | |
| 2014/0135413 A1 | 5/2014 | Yoo | |
| 2014/0178698 A1 | 6/2014 | Rathore | |
| 2014/0342165 A1 * | 11/2014 | Bruce | C09D 183/06 428/447 |

FOREIGN PATENT DOCUMENTS

| | | |
|---|---|---|
| CN | 101098911 | 1/2008 |
| CN | 101376812 | 3/2009 |
| CN | 101550217 | 10/2009 |
| CN | 101717565 | 6/2010 |
| CN | 101724394 | 6/2010 |
| CN | 101781390 | 7/2010 |
| CN | 102131819 | 7/2011 |
| CN | 102432920 | 5/2012 |
| CN | 102532554 | 7/2012 |
| CN | 102585073 | 7/2012 |
| CN | 102718930 | 10/2012 |
| CN | 103012689 | 4/2013 |
| CN | 103030752 | 4/2013 |
| CN | 103113812 | 5/2013 |
| CN | 103173041 | 6/2013 |
| CN | 103275273 | 9/2013 |
| CN | 103289021 | 9/2013 |
| EP | 0254418 | 1/1988 |
| EP | 0315226 | 5/1989 |
| EP | 0373941 | 6/1990 |

(56) References Cited

FOREIGN PATENT DOCUMENTS

| | | |
|---|---|---|
| EP | 0398701 | 11/1990 |
| EP | 0420155 | 4/1991 |
| EP | 0420585 | 4/1991 |
| EP | 0459257 | 12/1991 |
| EP | 0556953 | 8/1993 |
| EP | 0958805 | 11/1999 |
| EP | 2155761 | 2/2010 |
| JP | S55-111148 | 8/1980 |
| JP | S62-124159 | 6/1987 |
| JP | S62-130807 | 6/1987 |
| JP | S62-255957 | 11/1987 |
| JP | S63-291962 | 11/1988 |
| JP | 2541566 | 1/1989 |
| JP | H01-096265 | 4/1989 |
| JP | S64-90201 | 4/1989 |
| JP | H01-195458 | 8/1989 |
| JP | H02-233537 | 9/1990 |
| JP | H03-002808 | 1/1991 |
| JP | H03-154007 | 7/1991 |
| JP | H04-050243 | 2/1992 |
| JP | H04-110351 | 4/1992 |
| JP | H04-173863 | 6/1992 |
| JP | H04-175370 | 6/1992 |
| JP | H04-178411 | 6/1992 |
| JP | H05-271362 | 10/1993 |
| JP | H08-134308 | 5/1996 |
| JP | H11-060931 | 3/1999 |
| JP | H11-116681 | 4/1999 |
| JP | 2000-063674 | 2/2000 |
| JP | 2000-157928 | 6/2000 |
| JP | 2000-169591 | 6/2000 |
| JP | 2001-106925 | 4/2001 |
| JP | 2002-121536 | 4/2002 |
| JP | 2002-327030 | 11/2002 |
| JP | 2003-055459 | 2/2003 |
| JP | 2003-226835 | 8/2003 |
| JP | 3817192 | 9/2003 |
| JP | 2004-292541 | 10/2004 |
| JP | 2005-014293 | 1/2005 |
| JP | 2006-160880 | 6/2006 |
| JP | 2006-335978 | 12/2006 |
| JP | 2007-090865 | 4/2007 |
| JP | 2007-146148 | 6/2007 |
| JP | 2007-146150 | 6/2007 |
| JP | 2008-056751 | 3/2008 |
| JP | 2008-115302 | 5/2008 |
| JP | 2008-127405 | 6/2008 |
| JP | 2008-144053 | 6/2008 |
| JP | 2008-201908 | 9/2008 |
| JP | 2008-303358 | 12/2008 |
| JP | 2009-009045 | 1/2009 |
| JP | 2009-024077 | 2/2009 |
| JP | 2009-029893 | 2/2009 |
| JP | 2009-051934 | 3/2009 |
| JP | 2009-091466 | 4/2009 |
| JP | 2009-155496 | 7/2009 |
| JP | 2009-191120 | 8/2009 |
| JP | 2009-253203 | 10/2009 |
| JP | 2009-280706 | 12/2009 |
| JP | 2010-005613 | 1/2010 |
| JP | 2010-095619 | 4/2010 |
| JP | 2010-116442 | 5/2010 |
| JP | 2010-128080 | 6/2010 |
| JP | 2010-144153 | 7/2010 |
| JP | 2010-175798 | 8/2010 |
| JP | 2010-229303 | 10/2010 |
| JP | 2010-260881 | 11/2010 |
| JP | 2010-265410 | 11/2010 |
| JP | 2010-275521 | 12/2010 |
| JP | 2011-063482 | 3/2011 |
| JP | 2011-081123 | 4/2011 |
| JP | 2011-099074 | 5/2011 |
| JP | 2011-115755 | 6/2011 |
| JP | 2011-132087 | 7/2011 |
| JP | 2012-036335 | 2/2012 |
| JP | 2012-036336 | 2/2012 |
| JP | 2012-144661 | 8/2012 |
| JP | 2013-010843 | 1/2013 |
| JP | WO 2013008842 A1 * | 1/2013 ............. C08L 83/04 |
| JP | 2013-022791 | 2/2013 |
| JP | 2013-076075 | 4/2013 |
| JP | 2013-249371 | 12/2013 |
| JP | 2013-251103 | 12/2013 |
| JP | 2014-005363 | 1/2014 |
| JP | 2014-007058 | 1/2014 |
| KR | 2006-017891 | 2/2006 |
| KR | 2009-067315 | 6/2009 |
| KR | 2010-075235 | 7/2010 |
| KR | 2011-038471 | 4/2011 |
| KR | 2012-021926 | 3/2012 |
| KR | 2013-026991 | 3/2013 |
| KR | 2013-067401 | 6/2013 |
| WO | WO 2005-100426 | 10/2005 |
| WO | WO 2007-103654 | 9/2007 |
| WO | WO 2008-124080 | 10/2008 |
| WO | WO 2008-147072 | 12/2008 |
| WO | WO 2009-002660 | 12/2008 |
| WO | WO 2009-005880 | 1/2009 |
| WO | WO 2009-008452 | 1/2009 |
| WO | WO 2009-085926 | 7/2009 |
| WO | WO 2009-128441 | 10/2009 |
| WO | WO 2010-055632 | 5/2010 |
| WO | WO 2013-015469 | 1/2013 |
| WO | WO 2013-087365 | 6/2013 |
| WO | WO 2013-087366 | 6/2013 |
| WO | WO 2013-087368 | 6/2013 |
| WO | WO 2014-024379 | 2/2014 |
| WO | WO 2014-099699 | 6/2014 |
| WO | WO 2015-195268 | 12/2015 |
| WO | WO 2015-195355 | 12/2015 |
| WO | WO 2015-195391 | 12/2015 |

OTHER PUBLICATIONS

Boardman, "($\eta^5$-Cyclopentadienyl) Trialkylplatinum Photohydrosilylation Catalysts. Mechanism of Active Catalyst Formation and Preparation of a Novel Bis (Silyl) Platinum Hydride," Organometallics, 1992, vol. 11, No. 12, pp. 4194-4201.
Burget, "Kinetic Study of the Photoactivated Hydrosilylation of Some β-Dicarbonyl Complexes of Trialkylplatinum (IV)", Journal of Photochemistry and Photobiology A: Chemistry, 1996, vol. 97, pp. 163-170.
Ciba, "Coating Effects Segment IRGACURE 651", 2001, 2pgs.
Dow, "Dow Corning (R) 2-7466 Resin", Material Data Sheet, 2013, 2pgs.
Jakuczek, "Well-defined core-shell structures based on silsesquioxane microgels: Grafting of polystyrene via ATRP and product characterization", Polymer, 2008, vol. 49, pp. 843-856.
Lewis, "Platinum(II) Bis(β-Diketones) as Photoactivated Hydrosilation Catalysts", Inorganic Chemistry, 1995, vol. 34, No. 12, pp. 3182-3189.
Su, "New Photocurable Acrylic/Silsesquioxane Hybrid Optical Materials: Synthesis, Properties, and Patterning", Macromolecular Materials and Engineering, 2007, vol. 292, pp. 666-673.
Wang, "Photoactivated Hydrosilylation Reaction of Alkynes," Journal of Organometallic Chemistry, 2003, vol. 665, pp. 1-6.
International Search Report for PCT International Application No. PCT/US2014/068982, dated Mar. 16, 2015, 3pgs.

* cited by examiner

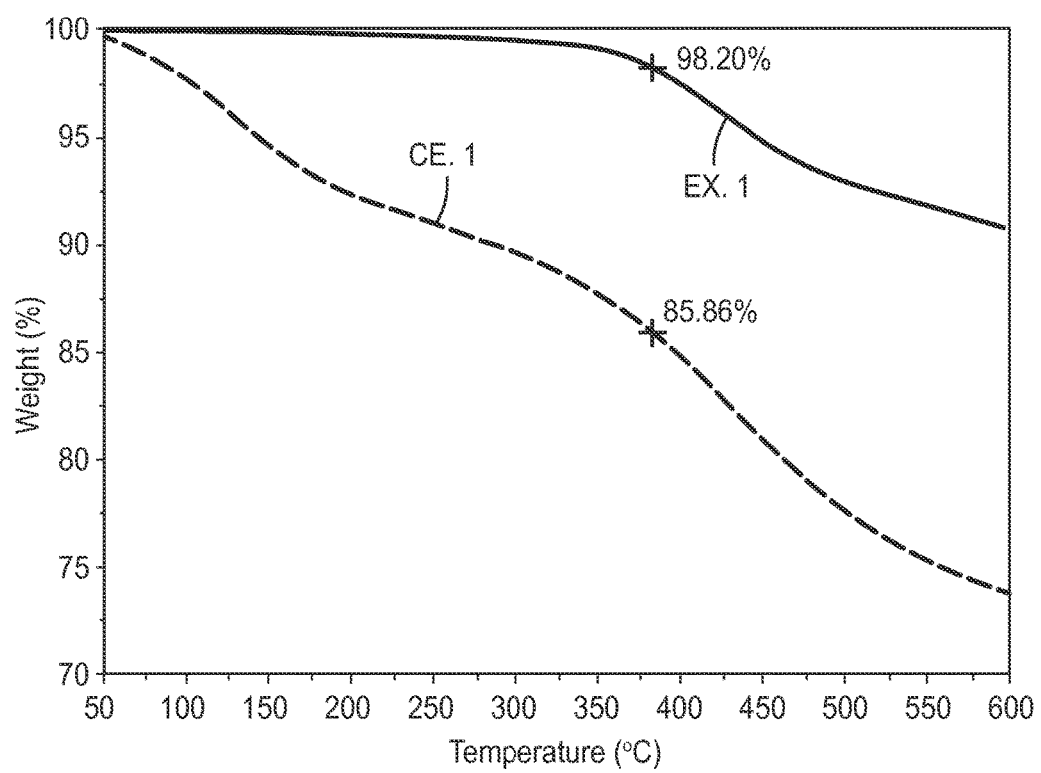

CURABLE SILSESQUIOXANE POLYMERS, COMPOSITIONS, ARTICLES, AND METHODS

CROSS REFERENCE TO RELATED APPLICATIONS

This application is a national stage filing under 35 U.S.C. 371 of PCT/US2014/068982, filed Dec. 8, 2014, which claims the benefit of Provisional Application No. 61/913,568, filed Dec. 9, 2013, and Provisional Application No. 62/014,735 filed Jun. 20, 2014, the disclosure of which is incorporated by reference in its/their entirety herein.

SUMMARY

The present disclosure provides a curable silsesquioxane polymer, a composition including such polymer, an article having a layer disposed thereon that includes the curable polymer and/or the cured polymer, and a method of forming a cured coating.

In one embodiment, the present disclosure provides a curable silsesquioxane polymer that includes a three-dimensional branched network having the formula:

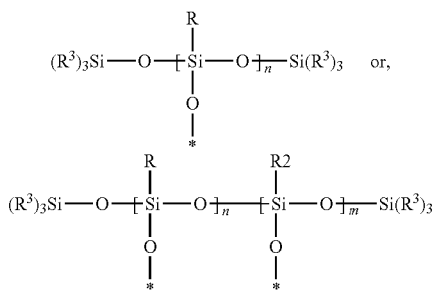

wherein the oxygen atom at the * is bonded to another Si atom within the three-dimensional branched network; R is an organic group comprising an ethylenically unsaturated group; R2 is an organic group that is not an ethylenically unsaturated group; R3 is a non-hydrolyzable group; and n or n+m is an integer of greater than 3.

In one embodiment, the present disclosure provides a curable silsesquioxane polymer that includes a three-dimensional branched network which is a reaction product of a compound having the formula Z—Y—Si($R^1$)$_3$, wherein Y is a bond or a divalent group selected from alkylene, arylene, alkarylene, and araalkylene; Z is an ethylenically unsaturated group selected from a vinyl group, a vinylether group, a (meth)acryloyloxy group, and a (meth)acryloylamino group; and each $R^1$ group is independently a hydrolyzable group; wherein the reaction product of the hydrolyzable group has been converted to OSi($R^3$)$_3$ wherein $R^3$ is a non-hydrolyzable group.

In another embodiment, a curable silsesquioxane polymer is provided that includes a three-dimensional branched network which is a condensation reaction product of a compound having the formula Z—Y—Si($R^1$)$_3$ as just described and a compound having the formula X—Y—Si($R^1$)$_3$, wherein each $R^1$ group and Y is the same as just described and X is hydrogen, a group selected from alkyl, aryl, aralkyl, alkyaryl, or a reactive group that is not an ethylenically unsaturated group, or a combination thereof. The alky group can optionally comprise (e.g. halogen) substituents, such as in the case of fluoroalkyl.

In some embodiments, the silsesquioxane polymer is free of hydrolyzed groups such as —OH group. In other embodiments, the silsesquioxane polymer further comprises hydrolyzed groups, typically in an amount no greater than 5 wt-%.

In one embodiment, a curable composition is described that includes a (e.g. free-radical) photoinitiator and a curable silsesquioxane polymer as described herein. In another embodiment, a curable composition is described that includes a hydrosilylation catalyst, such as a platinum catalyst, optionally a polyhydrosiloxane crosslinker and a curable silsesquioxane polymer as described herein. In certain embodiments, the curable composition can optionally include nanoparticles. In certain embodiments, the curable composition can optionally include an organic solvent.

In one embodiment, the present disclosure provides an article that includes a substrate and a curable composition of the present disclosure in a layer disposed on at least a portion of at least one surface of the substrate.

In one embodiment, the present disclosure provides an article that includes a substrate and a cured coating layer prepared by UV and/or thermal curing a curable composition as described herein disposed on at least a portion of at least one surface of the substrate.

In one embodiment, the present disclosure provides a method of making a cured coating on a substrate surface. In one embodiment, the method includes coating a curable composition of the present disclosure on at least a portion of at least one substrate surface; optionally exposing the coated curable composition to conditions that allow an organic solvent, if present, to evaporate from the curable composition; and UV and/or thermal curing the curable composition.

BRIEF DESCRIPTION OF THE DRAWINGS

FIG. 1 depicts a thermal gravimetric analysis (TGA) curve of EX1 and comparative example CE-1.

DETAILED DESCRIPTION

As used herein, the term "organic group" means a hydrocarbon group (with optional elements other than carbon and hydrogen, such as oxygen, nitrogen, sulfur, silicon, and halogens) that is classified as an aliphatic group, cyclic group, or combination of aliphatic and cyclic groups (e.g., alkaryl and aralkyl groups). In the context of the present invention, the organic groups are those that do not interfere with the formation of curable silsesquioxane polymer. The term "aliphatic group" means a saturated or unsaturated linear or branched hydrocarbon group. This term is used to encompass alkyl, alkenyl, and alkynyl groups, for example. The term "alkyl group" is defined herein below. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group, aromatic group, or heterocyclic group. The term "alicyclic group" means a cyclic hydrocarbon group having properties resembling those of aliphatic groups. The term "aromatic group" or "aryl group" are defined herein below. The term "heterocyclic group" means a closed ring hydrocarbon in which one or more of the atoms in the ring is an element other than carbon (e.g., nitrogen, oxygen, sulfur, etc.). The organic group can have any suitable valency but is often monovalent or divalent.

The term "alkyl" refers to a monovalent group that is a radical of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 30 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms. Examples of alkyl groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "alkylene" refers to a divalent group that is a radical of an alkane and includes groups that are linear, branched, cyclic, bicyclic, or a combination thereof. Unless otherwise indicated, the alkylene group typically has 1 to 30 carbon atoms. In some embodiments, the alkylene group has 1 to 20 carbon atoms, 1 to 10 carbon atoms, 1 to 6 carbon atoms, or 1 to 4 carbon atoms. Examples of alkylene groups include, but are not limited to, methylene, ethylene, 1,3-propylene, 1,2-propylene, 1,4-butylene, 1,4-cyclohexylene, and 1,4-cyclohexyldimethylene.

The term "alkoxy" refers to a monovalent group having an oxy group bonded directly to an alkyl group.

The term "aryl" refers to a monovalent group that is aromatic and, optionally, carbocyclic. The aryl has at least one aromatic ring. Any additional rings can be unsaturated, partially saturated, saturated, or aromatic. Optionally, the aromatic ring can have one or more additional carbocyclic rings that are fused to the aromatic ring. Unless otherwise indicated, the aryl groups typically contain from 6 to 30 carbon atoms. In some embodiments, the aryl groups contain 6 to 20, 6 to 18, 6 to 16, 6 to 12, or 6 to 10 carbon atoms. Examples of an aryl group include phenyl, naphthyl, biphenyl, phenanthryl, and anthracyl.

The term "arylene" refers to a divalent group that is aromatic and, optionally, carbocyclic. The arylene has at least one aromatic ring. Any additional rings can be unsaturated, partially saturated, or saturated. Optionally, an aromatic ring can have one or more additional carbocyclic rings that are fused to the aromatic ring. Unless otherwise indicated, arylene groups often have 6 to 20 carbon atoms, 6 to 18 carbon atoms, 6 to 16 carbon atoms, 6 to 12 carbon atoms, or 6 to 10 carbon atoms.

The term "aralkyl" refers to a monovalent group that is an alkyl group substituted with an aryl group (e.g., as in a benzyl group). The term "alkaryl" refers to a monovalent group that is an aryl substituted with an alkyl group (e.g., as in a tolyl group). Unless otherwise indicated, for both groups, the alkyl portion often has 1 to 10 carbon atoms, 1 to 6 carbon atoms, or 1 to 4 carbon atoms and an aryl portion often has 6 to 20 carbon atoms, 6 to 18 carbon atoms, 6 to 16 carbon atoms, 6 to 12 carbon atoms, or 6 to 10 carbon atoms.

The term "aralkylene" refers to a divalent group that is an alkylene group substituted with an aryl group or an alkylene group attached to an arylene group. The term "alkarylene" refers to a divalent group that is an arylene group substituted with an alkyl group or an arylene group attached to an alkylene group. Unless otherwise indicated, for both groups, the alkyl or alkylene portion typically has from 1 to 20 carbon atoms, 1 to 10 carbon atoms, 1 to 6 carbon atoms, or 1 to 4 carbon atoms. Unless otherwise indicated, for both groups, the aryl or arylene portion typically has from 6 to 20 carbon atoms, 6 to 18 carbon atoms, 6 to 16 carbon atoms, 6 to 12 carbon atoms, or 6 to 10 carbon atoms.

The term "hydrolyzable group" refers to a group that can react with water having a pH of 1 to 10 under conditions of atmospheric pressure. The hydrolyzable group is often converted to a hydroxyl group when it reacts. Typical hydrolyzable groups include, but are not limited to, alkoxy, aryloxy, aralkyloxy, alkaryloxy, acyloxy, or a halogen (directly bonded to a silicon atom). The hydrolysis reaction converts the hydrolyzable groups to hydrolyzed groups (e.g. hydroxyl group) that undergo further reactions such as condensation reaction. As used herein, the term is often used in reference to one of more groups bonded to a silicon atom in a silyl group.

The term "alkoxy" refers to a monovalent group having an oxy group bonded directly to an alkyl group.

The term "aryloxy" refers to a monovalent group having an oxy group bonded directly to an aryl group.

The terms "aralkyloxy" and "alkaryloxy" refer to a monovalent group having an oxy group bonded directly to an aralkyl group or an alkaryl group, respectively.

The term "acyloxy" refers to a monovalent group of the formula —O(CO)R$^b$ where R$^b$ is alkyl, aryl, aralkyl, or alkaryl. Suitable alkyl R$^b$ groups often have 1 to 10 carbon atoms, 1 to 6 carbon atoms, or 1 to 4 carbon atoms. Suitable aryl R$^b$ groups often have 6 to 12 carbon atoms such as, for example, phenyl. Suitable aralkyl and alkaryl R$^b$ groups often have an alkyl group with 1 to 10 carbon atoms, 1 to 6 carbon atoms, or 1 to 4 carbon atoms and an aryl having 6 to 12 carbon atoms.

The term "halo" refers to a halogen atom such as fluoro, bromo, iodo, or chloro. When part of a reactive silyl, the halo group is often chloro.

The term "(meth)acryloyloxy group" includes an acryloyloxy group (—O—(CO)—CH=CH$_2$) and a methacryloyloxy group (—O—(CO)—C(CH$_3$)=CH$_2$).

The term "(meth)acryloylamino group" includes an acryloylamino group (—NR—(CO)—CH=CH$_2$) and a methacryloylamino group (—NR—(CO)—C(CH$_3$)=CH$_2$) including embodiments wherein the amide nitrogen is bonded to a hydrogen, methyl group, or ethyl group (R is H, methyl, or ethyl).

The terms "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and preferably by the term "exactly." As used herein, in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

When a group is present more than once in a formula described herein, each group is "independently" selected, whether specifically stated or not. For example, when more than one R group is present in a formula, each R group is independently selected. Furthermore, subgroups contained within these groups are also independently selected. For ample, when each R group contains a Y group, each Y is also independently selected.

As used herein, the term "room temperature" refers to a temperature of 20° C. to 25° C. or 22° C. to 25° C.

A silsesquioxane is an organosilicon compound with the empirical chemical formula R'SiO$_{3/2}$ where Si is the element silicon, O is oxygen and R' is either hydrogen or an aliphatic or aromatic organic group that optionally further comprises an ethylenically unsaturated group. Thus, silsesquioxanes polymers comprise silicon atoms bonded to three oxygen atoms. Silsesquioxanes polymers that have a random branched structure are typically liquids at room temperature. Silsesquioxanes polymers that have a non-random structure like cubes, hexagonal prisms, octagonal prisms, decagonal prisms, and dodecagonal prisms are typically solids as room temperature.

The above summary is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The curable silsesquioxane polymer can be a homopolymer or copolymer. As used herein, the term "polymer" refers to the homopolymer and copolymer unless indicated otherwise.

In one embodiment, the present disclosure provides a curable silsesquioxane polymer that includes a three-dimensional branched network having the formula:

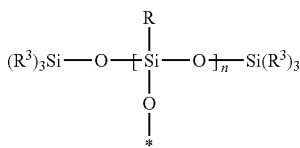

wherein the oxygen atom at the * is bonded to another Si atom within the three-dimensional branched network, R is an organic group comprising an ethylenically unsaturated group, and R$^3$ is independently a non-hydrolyzable group. In typical embodiments, R$^3$ is C$_1$-C$_{12}$ alkyl optionally comprising halogen substituents, aryl, or a combination thereof.

In another embodiment, the present disclosure provides a curable silsesquioxane polymer that includes a three-dimensional branched network having the formula:

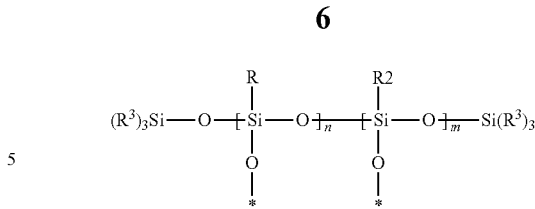

wherein the oxygen atom at the * is bonded to another Si atom within the three-dimensional branched network, R is an organic group comprising an ethylenically unsaturated group R2 is an organic group that is not an ethylenically unsaturated group; R$^3$ is a non-hydrolyzable group; and n or n+m is an integer of greater than 3.

The term three-dimensional branched network refers to a branched silsesquioxane polymer. The branched silsesquioxane polymer comprises ethylenically unsaturated groups that can be crosslinked. Hence, the branched silsesquioxane polymer can be considered a precursor that has not yet reached its gel point.

In certain embodiments of the curable silsesquioxane polymer, R is an organic group that includes an ethylenically unsaturated group. In certain embodiments of the curable silsesquioxane polymer, R has the formula Y—Z, as will subsequently be described.

In certain embodiments of the curable silsesquioxane polymer, R2 is an organic group that lacks an ethylenically unsaturated group. In certain embodiments of the curable silsesquioxane polymer, R2 has the formula Y—X, as will subsequently be described.

The SSQ polymer comprises at least two ethylenically unsaturated groups. Thus, n is an integer of at least 2 and in some embodiments at least 3, 4, 5, 6, 7, 8 or 9. For embodiments wherein the curable silsesquioxane polymer is a copolymer comprising both n and m units, m is at least 1, 2, 3, 4, 5, 6, 7, 8, 9 and the sum of n+m is an integer of 3 or greater than 3. In certain embodiments, n, m, or n+m is an integer of at least 10, 15, 20, 25, 30, 35, 40, 45, or 50. In certain embodiments, n or m is an integer of no greater than 500, 450, 400, 350, 300, 250, or 200. Thus, n+m can range up to 1000. In certain embodiments, n+m is an integer of no greater than 175, 150, or 125. In some embodiments, n and m are selected such the copolymer comprises at least 25, 26, 27, 28, 29, or 30 mol % of repeat units comprising ethylenically unsaturated group(s) R. In some embodiments, n and m are selected such the copolymer comprises no greater than 85, 80, 75, 70, 65, or 60 mol % of repeat units comprising ethylenically unsaturated group(s) R.

In some embodiments, the silsesquioxane polymer is free of hydrolyzed groups such as —OH group. In other embodiments, the silsesquioxane polymer further comprises hydrolyzed groups such as —OH groups. In some embodiments, the amount of hydrolyzed groups (e.g. —OH groups) is no greater than 15, 10, or 5 wt.-%. In still other embodiments, the amount of hydrolyzed groups (e.g. —OH groups) is no greater than 4, 3, 2 or 1 wt-%. The silsesquioxane polymer and curable compositions comprising such can exhibit improved shelf life and thermal stability in comparison to curable silsesquioxane polymers having higher concentrations of —OH groups.

With reference to FIG. 1, reducing the concentration of —OH groups can result in the curable silsesquioxane polymer exhibiting a substantially lower weight loss when heated as can be determined by thermogravimetric analysis as further described in the examples. In some embodiments, the curable silsesquioxane polymer has a weight loss of less than 90%, 91%, 92%, 93%, 94%, 95%, 96%, 97%, 99%, or 98% at 200° C. Further, in some embodiments, the curable silsesquioxane polymer has a weight loss of less than 85%, 90%, or 95% at temperatures ranging from 300° C. to 400°

C. Further, in some embodiments, the curable silsesquioxane polymer has a weight loss of less than 80%, 85% or 90% at 500° C.

In one embodiment, the present disclosure provides a curable silsesquioxane polymer that includes a three-dimensional branched network which is a reaction product of a compound having the formula Z—Y—Si(R$^1$)$_3$. In this embodiment, R has the formula Y—Z.

In another embodiment, the present disclosure provides a curable silsesquioxane copolymer that includes a three-dimensional branched network which is a reaction product of a compound having the formula Z—Y—Si(R$^1$)$_3$ and a compound having the formula X—Y—Si(R$^1$)$_3$. In this embodiment, R has the formula Y—Z and R2 has the formula Y—X.

The Y group is a covalent bond (as depicted in the above formulas), or is a divalent organic group selected from alkylene group, arylene, alkyarylene, and arylalkylene group. In certain embodiments, Y is a (C1-C20)alkylene group, a (C6-C12)arylene group, a (C6-C12)alk(C1-C20)arylene group, a (C6-C12)ar(C1-C20)alkylene group, or a combination thereof. Y may optionally further comprise (e.g. contiguous) oxygen, nitrogen, sulfur, silicon, or halogen substituents, and combinations thereof. In some embodiments, Y does not comprise oxygen or nitrogen substituents that can be less thermally stable.

The group Z is an ethylenically unsaturated group selected from a vinyl group, a vinylether group, a (meth)acryloyloxy group, and a (meth)acryloylamino group (including embodiments wherein the nitrogen is optionally substituted with an alkyl such as methyl or ethyl). In certain embodiments, Z is a vinyl group. When Y is alkylene and Z is a vinyl group, Y—Z is an alkenyl group. Such alkenyl group may have the formula (H$_2$C=CH(CH$_2$)$_n$— wherein —(CH$_2$) n is alkylene as previously defined.

The X group is hydrogen or a (monovalent) organic group selected from alkyl, aryl, alkaryl, aralkyl, that are optionally comprise halogen or other substituents; or a reactive group that is not an ethylenically unsaturated group. X may optionally further comprise (e.g. contiguous) oxygen, nitrogen, sulfur, silicon, substituents. In some embodiments, X is an optionally halogenated (C1-C20)alkyl group such as (C4-C6) fluoroalkyl, a (C6-C12)aryl group, a (C6-C12)alk(C1-C20)aryl group, a (C6-C12)ar(C1-C20)alkyl group, a reactive group that is not an ethylenically unsaturated group, or a combination thereof. In some embodiments, X comprises an epoxide ring.

Curable silsesquioxane polymers can be made by hydrolysis and condensation of reactants of the formula Z—Y—Si(R$^1$)$_3$. Examples of such reactants include vinyltriethoxysilane, allyltriethoxysilane, allylphenylpropyltriethoxysilane, 3-butenyltriethoxysilane, docosenyltriethoxysilane, and hexenyltriethoxysilane. Condensation of such reactants can be carried out using conventional techniques, as exemplified in the examples section. In some embodiments, the curable silsesquioxane polymers are made by the hydrolysis and condensation of reactants of the formula Z—Y—Si(R$^1$)$_3$ and X—Y—Si(R$^1$)$_3$.

In each of the formulas Z—Y—Si(R$^1$)$_3$ and X—Y—Si(R$^1$)$_3$, R$^1$ is independently a hydrolyzable group that is converted to a hydrolyzed group, such as —OH, during hydrolysis. The Si—OH groups react with each other to form silicone-oxygen linkages such that the majority of silicon atoms are bonded to three oxygen atoms. After hydrolysis, the —OH groups are further reacted with an end-capping agent to convert the hydrolyzed group, e.g. —OH, to —OSi(R$^3$)$_3$. The silsesquioxane polymer comprises terminal groups having the formula —Si(R$^3$)$_3$ after end-capping.

Various alkoxy silane end-capping agents are known. In some embodiments, the end-capping agent has the general structure R$^5$OSi(R$^3$)$_3$ or O[Si(R$^3$)$_3$]$_2$ wherein R$^5$ is a hydrolyzable group such as methoxy or ethoxy and R$^3$ is independently a non-hydrolyzable group. Thus, in some embodiments R$^3$ generally lacks an oxygen atom or a halogen directly bonded to a silicon atom. Thus, R$^3$ generally lacks an alkoxy group. R$^3$ is independently alkyl, aryl (e.g. phenyl), or combination thereof (e.g. aralkylene, alkarylene); that optionally comprises halogen substituents (e.g. chloro, bromo, fluoro). The optionally substituted alkyl group may have a straight, branched, or cyclic structure. In some embodiments, R$^3$ is C$_1$-C$_{12}$ or C$_1$-C$_4$ alkyl optionally comprising halogen substituents. R$^3$ may optionally comprise (e.g. contiguous) oxygen, nitrogen, sulfur, or silicon substituents. In some embodiments, R$^3$ does not comprise oxygen or nitrogen substituents that can be less thermally stable.

A non-limiting list of illustrative end-capping agents and the resulting R$^3$ groups is as follows:

| End-capping agent | R$^3$ |
|---|---|
| n-butyldimethylmethoxysilane | n-butyldimethyl |
| t-butyldiphenylmethoxysilane | t-butyldiphenyl |
| 3-chloroisobutyldimethylmethoxysilane | 3-chloroisobutyldimethyl |
| phenyldimethylethoxysilane | phenyldimethyl |
| n-propyldimethylmethoxysilane | n-propyldimethyl |
| triethylethoxysilane | triethyl |
| trimethylmethoxysilane | trimethyl |
| triphenylethoxysilane | triphenyl |
| n-octyldimethylmethoxysilane | n-octyldimethyl |
| Hexamethyldisiloxane | trimethyl |
| hexaethyldisiloxane | triethyl |
| 1,1,1,3,3,3-hexaphenyldisiloxane | triphenyl |
| 1,1,1,3,3,3-hexakis(4-(dimethylamino)phenyl)disiloxane | tri-[4-(dimethylamino)phenyl] |
| 1,1,1,3,3,3-hexakis(3-fluorobenzyl)disiloxane | tri-(3-fluorobenzyl) |

Prior to end-capping, exemplary polymers prepared from reactants of the formula Z—Y—Si(R$^1$)$_3$ are as follows:

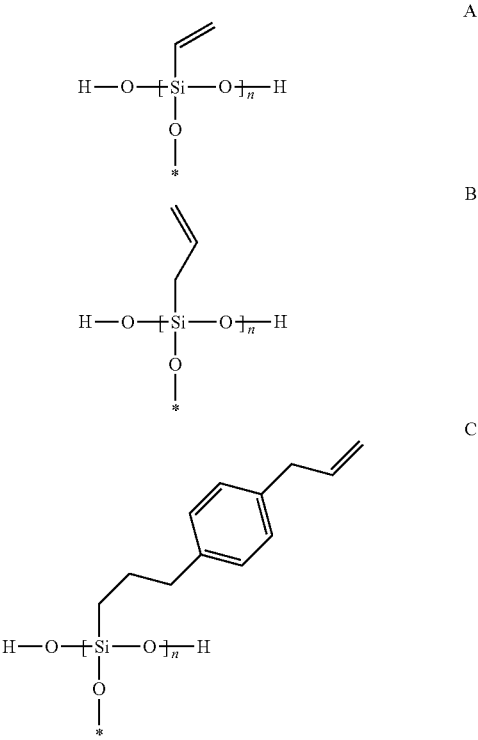

-continued

D
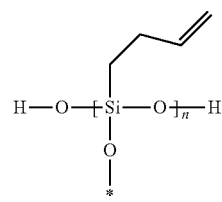

E
$C_{20}H_{40}CH=CH_2$
H—O—[Si—O]$_n$—H

F
$C_4H_8CH=CH_2$
H—O—[Si—O]$_n$—H

Polymers made from such reactants of the formula Z—Y—Si(R$^1$)$_3$ are poly(vinylsilsesquioxane) (A), poly(allylsilsesquioxane) (B), poly(allylphenylpropylsilsesquioxane) (C), poly(3-butenylsilsesquioxane) (D), poly(docosenyl silsesquioxane) (E), and poly(hexenylsilsesquioxane) (F).

In one naming convention, the R$^3$ group derived from the end-capping agent is included in the name of the polymer. One exemplary curable silsesquioxane polymer of the present disclosure end-capped with ethoxytrimethylsilane is trimethyl silyl poly(vinylsilsesquioxane) having the general formula:

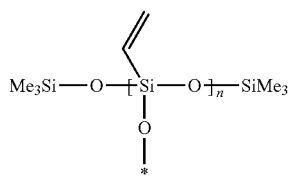

wherein the oxygen atom in the formula above at the * above is bonded to another Si atom within the three-dimensional branched network. Such three-dimensional branched network structure is depicted as follows:

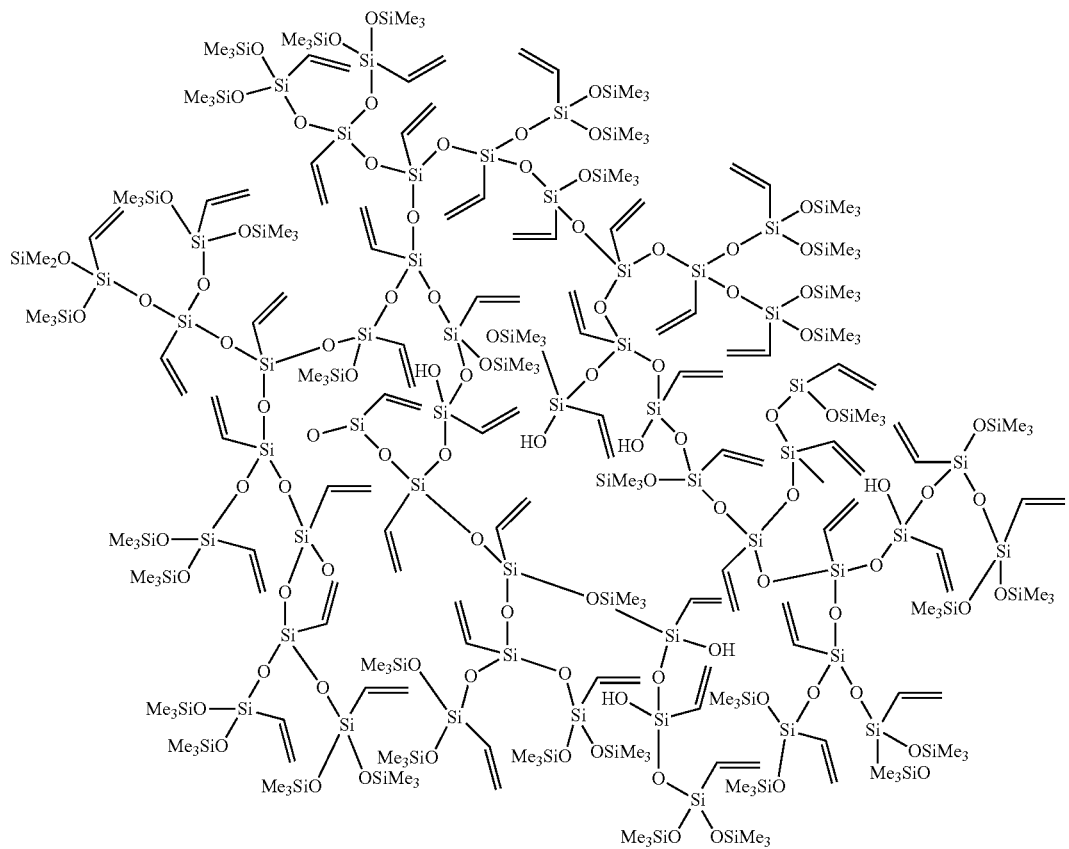

In other embodiments, curable silsesquioxane copolymers can be made with two or more reactants of the formula Z—Y—Si(R$^1$)$_3$. For example, vinyltriethoxylsilane or allytriethoxysilane can be coreacted with an alkenylalkoxylsilane such as 3-butenyltriethoxysilane and hexenyltriethoxysilane. In this embodiment, the silsesquioxane polymers may comprise at least two different Z groups (e.g. Z' and Z"), yet the same Y groups. Alternatively, the silsesquioxane polymers may comprise at least two different Y groups (e.g. Y' and Y"), yet the same Z group (e.g. vinyl). Further, the silsesquioxane polymers may comprise at least two reactants wherein both Y and Z are different than each other. In such embodiment, R of the curable silsesquioxane polymer formulas is independently an organic group comprising an ethylenically unsaturated group (e.g. such as a vinyl group). Further, n represents the total number of repeat units independently comprising an ethylenically unsaturated group.

In yet other embodiments, curable silsesquioxane copolymers can be made with at least one reactant of the formula Z—Y—Si(R$^1$)$_3$ and at least one reactant of the formula X—Y—Si(R$^1$)$_3$. Examples of reactants of the formula X—Y—Si(R$^1$)$_3$ include for example aromatic trialkoxysilanes such as phenyltrimethoxylsilane, (e.g. C1-C12) alkyl trialkoxysilanes such as methyltrimethoxylsilane, fluoroalkyl trialkoxysilanes such as nonafluorohexyltriethoxysilane, and trialkoxysilanes comprising a reactive group that is not an ethylenically unsaturated group such as glycidoxypropyltriethoxysilane; (3-glycidoxypropyltriethoxysilane 5,6-epoxyhexyltriethoxysilane; 2-(3,4-epoxycyclohexyl)ethyltriethoxysilane 3-(diphenylphosphino)propyltriethoxysilane; mercaptopropyltriethoxysilane; s-(octanoyl)mercaptopropyltriethoxysilane; 3-isocyanatopropyltriethoxysilane; hydroxy(polyethyleneoxy)propyl]triethoxysilane; hydroxymethyltriethoxysilane; 3-cyanopropyltriethoxysilane; 2-cyanoethyltriethoxysilane; and 2-(4-pyridylethyl)triethoxysilane.

Other commercially available X—Y—Si(R$^1$)$_3$ reactants include for example trimethylsiloxytriethoxysilane; p-tolyltriethoxysilane; tetrahydrofurfuryloxypropyltriethoxysilane; n-propyltriethoxysilane; (4-perfluorooctylphenyl)triethoxysilane; pentafluorophenyltriethoxysilane; nonafluorohexyltriethoxysilane; 1-naphthyltriethoxysilane; 3,4-methylenedioxyphenyltriethoxysilane; p-methoxyphenyltriethoxysilane; 3-isooctyltriethoxysilane; isobutyltriethoxysilane; (heptadecafluoro-1,1,2,2-tetrahydrodecyl)triethoxysilane; 3,5-dimethoxyphenyltriethoxysilane; (n,n-diethylaminomethyl)triethoxysilane; n-cyclohexylaminomethyl)triethoxysilane; chloroundecyltriethoxysilane; 3-chloropropyltriethoxysilane; p-chlorophenyltriethoxysilane; chlorophenyltriethoxysilane; butylpoly(dimethylsiloxanyl)ethyltriethoxysilane; n,n-bis(2-hydroxyethyl)-3-aminopropyltriethoxysilane; benzyltriethoxysilane; and 2-[(acetoxy(polyethyleneoxy)propyl]triethoxysilane.

When curable silsesquioxane copolymers are made with two or more reactants of the formula X—Y—Si(R$^1$)$_3$, the silsesquioxane polymers may comprise at least two different X groups (e.g. X' and X"), yet the same Y groups. Alternatively, the silsesquioxane polymers may comprise at least two different Y groups (e.g. Y' and Y"), yet the same X group. Further, the silsesquioxane polymers may comprise at least two reactants wherein both Y and X are different from each other. In such embodiment, R2 of the curable silsesquioxane polymer formulas is independently an organic group lacking an ethylenically unsaturated group (e.g. such as a vinyl group). Further, m represents the total number of repeat units independently lacking ethylenically unsaturated group.

The inclusion of the co-reactant of the formula Z—Y—Si(R$^1$)$_3$ can be used to enhance certain properties depending on the selection of the R2 group. For example, when R2 comprises an aromatic group such as phenyl, the thermal stability can be improved (relative to a homopolymer of vinyltrimethoxysilane). When R2 comprises a reactive group, such as an epoxy, improved hardness can be obtained (relative to a homopolymer of vinyltrimethoxysilane). Further, when R2 comprises a fluoroalkyl group, the hydrophobicity can be improved.

The amount of reactant(s) of the formula Z—Y—Si(R$^1$)$_3$ can range up to 100 mol % in the case of homopolymers. The copolymers typically comprise no greater than 99, 98, 97, 96, 95, 94, 93, 92, 91, or 90 mol % of reactant(s) of the formula Z—Y—Si(R$^1$)$_3$. In some embodiments, the amount of reactant(s) of the formula Z—Y—Si(R$^1$)$_3$ is no greater than 85, 80, 75, 70, or 60 mol %. In some embodiments, the amount of reactant(s) of the formula Z—Y—Si(R$^1$)$_3$ is at least 15, 20, 25, or 30 mol %.

The amount of reactant(s) of the formula X—Y—Si(R$^1$)$_3$ can be as little as 1, 2, 3, 4, 5, 6, 7, 8, 9, or 10 mol % of the copolymer. The amount of reactant(s) of the formula X—Y—Si(R$^1$)$_3$ is typically no greater than 75 mol % or 70 mol %. In some embodiments, the amount of reactant(s) of the formula X—Y—Si(R$^1$)$_3$ is at least 15, 20, 25, or 30 mol %. In some embodiments, the amount of reactant(s) of the formula X—Y—Si(R$^1$)$_3$ is no greater than 65 or 60 mol %. It is appreciated that the amount of reactants of the formula Z—Y—Si(R$^1$)$_3$ or X—Y—Si(R$^1$)$_3$ is equivalent to the amount of repeat units derived from Z—Y—Si(R$^1$)$_3$ or X—Y—Si(R$^1$)$_3$. In some embodiments the molar ratio of reactant(s) of the formula Z—Y—Si(R$^1$)$_3$ to molar ratio to reactant(s) of the formula X—Y—Si(R$^1$)$_3$ ranges from about 10:1; 15:1, or 10:1 to 1:4; or 1:3, or 1:2. Exemplary curable silsesquioxane copolymers of the present disclosure may have the general formula:

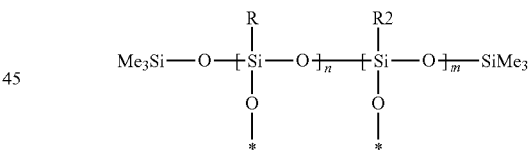

wherein the oxygen atom in the formula above at the * above is bonded to another Si atom within the three-dimensional branched network; R is a vinyl group; n is an integer of greater than 3; and R2 is hydrogen, phenyl, methyl, nonafluorohexyl, or glycidoxypropyl are depicted as follows:

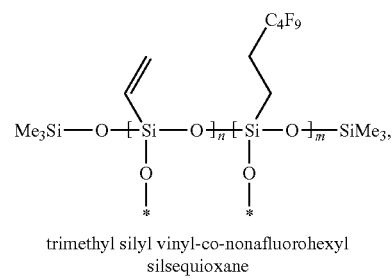

trimethyl silyl vinyl-co-nonafluorohexyl silsequioxane

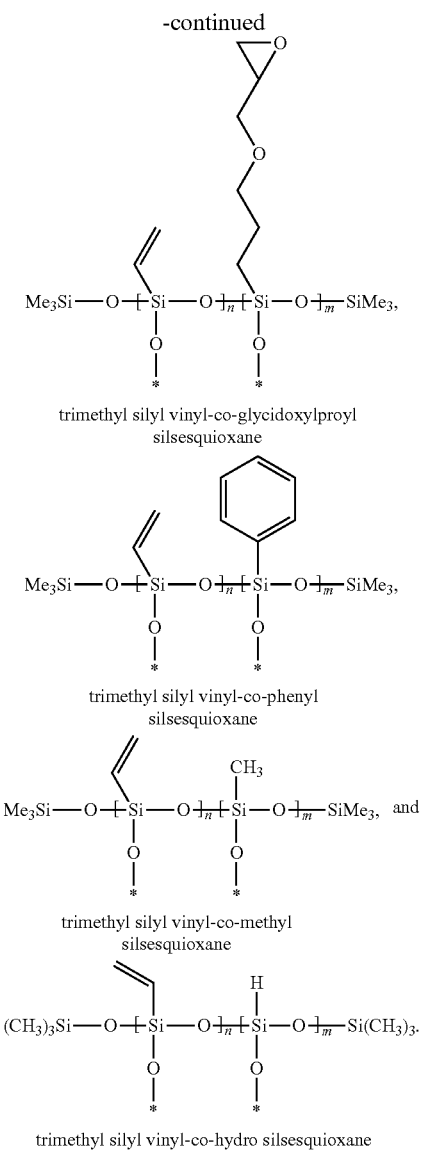

trimethyl silyl vinyl-co-glycidoxylproyl silsesquioxane trimethyl silyl vinyl-co-phenyl silsesquioxane trimethyl silyl vinyl-co-methyl silsesquioxane trimethyl silyl vinyl-co-hydro silsesquioxane In each of the formula depicted herein, one or more of the methyl end groups of $SiMe_3$ can be any other non-hydrolyzable group as previously described.

In some embodiments, the curable silsesquioxane polymers are generally tacky, soluble in organic solvents (particularly polar organic solvents), and coatable. Thus, such curable silsesquioxane polymers can be easily processed. They can be easily applied to a substrate. They also adhere well to a variety of substrates. For example, in certain embodiments, a curable silsesquioxane polymer of the present disclosure has peel force from glass of at least 0.1, 0.2, 0.3, 0.4, 0.5 or 1 Newton per decimeter (N/dm), or at least 2 N/dm, per the Method for Peel Adhesion Measurement detailed in the Examples Section. In certain embodiments, a curable silsesquioxane polymer of the present disclosure has peel force from glass of no greater than 6 N/dm, per the Method for Peel Adhesion Measurement detailed in the examples.

In other embodiments, the curable silsesquioxane polymer can provide a (e.g. weatherable) protective hard coating that has multiple applications. For example, such coatings can be used as anti-scratch and anti-abrasion coatings for various polycarbonate lens and polyesters films, which require additional properties such as optical clarity, durability, hydrophobicity, etc., or any other application where use of temperature, radiation, or moisture may cause degradation of films.

Curable silsesquioxane polymers, as described herein, can be combined with a photoinitiator and UV cured. Suitable photoinitiators include a variety of free-radical photoinitiators. Exemplary free-radical photoinitiators can be selected from benzophenone, 4-methylbenzophenone, benzoyl benzoate, phenylacetophenones, 2,2-dimethoxy-2-phenylacetophenone, alpha,alpha-diethoxyacetophenone, 1-hydroxy-cyclohexyl-phenyl-ketone (available under the trade designation IRGACURE 184 from BASF Corp., Florham Park, N.J.), 2-hydroxy-2-methyl-1-phenylpropan-1-one, bis-(2,6-dimethoxybenzoyl)-2,4,4-trimethylpentyl phosphine oxide, 2-hydroxy-2-methyl-1-phenylpropan-1-one, 2-hydroxy-2-methyl-1-phenylpropan-1-one (available under the trade designation DAROCURE 1173 from BASF Corp.), 2,4,6-trimethylbenzoyl-diphenylphosphine oxide, and combinations thereof (e.g., a 50:50 by wt. mixture of 2,4,6-trimethylbenzoyl-diphenylphosphine oxide and 2-hydroxy-2-methyl-1-phenylpropan-1-one, available under the trade designation DAROCURE 4265 from BASF Corp.).

A photoinitiator is typically present in a coating composition in an amount of at least 0.01 percent by weight (wt-%), based on the total weight of curable material in the coating composition. A photoinitiator is typically present in a coating composition in an amount of no greater than 5 wt-%, based on the total weight of curable material in the coating composition.

The curable silsesquioxane polymers comprising ethylenically unsaturated groups, as described herein, can be utilized to crosslink other ethylenically unsaturated monomers, oligomers, and/or polymers. Surprisingly, the silsesquioxane polymers comprising vinyl and alkenyl groups have been found to free-radically polymerize by means of photocuring (e.g. at room temperature, 25° C.).

In some embodiments, the curable silsesquioxane polymers described herein can be utilized to crosslink vinyl or (meth)acrylate functional siloxanes, such as polydimethylsiloxane materials. In some embodiments, the polydimethylsiloxane is vinyl or (meth)acrylate terminated, having the general formula R-L-[Si(CH$_3$)$_2$O]$_n$Si(CH$_3$)$_2$-L-R, where n is the number of repeating monomer [SiO(CH$_3$)$_2$] units, L is a divalent (e.g. C$_1$-C$_4$) alkylene) linking group and R is vinyl or (meth)acrylate. Alternatively, the polydimethylsiloxane may comprise vinyl groups in the backbone such as in the case of a vinylmethyl siloxane homopolymer available from Gelest under the trade "VMS-T11". Various other vinyl or (meth)acrylate functional polydimethylsiloxanes are known that include other siloxane units in the backbone, other terminal groups, and/or have a different structure.

The molecular weight (Mw) of such vinyl or (meth) acrylate functional siloxanes typically ranges from about 200 to about 200,000 g/mole. In some embodiments, the molecular weight is no greater than about 100,000 or 50,000 g/mole. In some embodiments, the molecular weight is no greater than about 20,000; 15,000; 10,000 or 5,000 g/mole. The wt-% of vinyl or (meth)acrylate of the functional siloxanes is typically at least 0.02, 0.03, 0.04, or 0.05 wt-% ranging up to about 10, 15, 20, 25, or 30 wt-%. In some embodiments, the wt-% of vinyl or (meth)acrylate is less than 1 or 0.5 wt-%

Curable silsesquioxane polymers, as described herein, can be combined with a hydrosilylation catalyst and optionally a polyhydrosiloxane crosslinker and thermally cured by heating the curable coating.

Various hydrosilylation catalysts are knows. For examples, numerous patents describe the use of various complexes of cobalt, rhodium or platinum as catalysts for accelerating the thermally-activated addition reaction between a compound containing silicon-bonded to hydrogen and a compound containing aliphatic unsaturation. Various platinum catalyst are known such as described in U.S. Pat. No. 4,530,879; U.S. Pat. No. 4,510,094; U.S. Pat. No. 4,600,484; U.S. Pat. No. 5,145,886; and EP 0 398701; incorporated herein by reference. In one embodiment, the catalyst is a complex comprising platinum and an unsaturated silane or siloxane as described in U.S. Pat. No. 3,775,452; incorporated herein by reference. One exemplary catalyst of this type bis(1,3-divinyl-1,1,3,3-tetrametyldisiloxane) platinum.

Various hydrosiloxane crosslinkers are known. Hydrosiloxane crosslinkers have the following general formula.

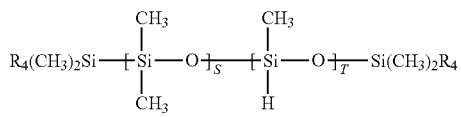

wherein T can be 0, 1, 2 and is typically less than 300; S can be 0, 1, or 2 and is typically less than 500; and $R_4$ is independently hydrogen or a $C_1$-$C_4$ alkyl and more typically H, methyl or ethyl; and
with the proviso that when T is 0 at least one $R_4$ is hydrogen.

Curable silsesquioxane polymers can be combined with nanoparticles that can impart hardness to a coating. Suitable nanoparticles of the present disclosure include an inorganic oxide. Exemplary nanoparticle can include an oxide of a non-metal, an oxide of a metal, or combinations thereof. An oxide of a non-metal includes an oxide of, for example, silicon or germanium. An oxide of a metal includes an oxide of, for example, iron, titanium, cerium, aluminum, zirconium, vanadium, zinc, antimony, and tin. A combination of a metal and non-metal oxide includes an oxide of aluminum and silicon.

The nanoparticle can have an average particle size of no greater than 100 nanometers (nm), no greater than 75 nanometers, no greater than 50 nanometers, no greater than 25 nanometers, no greater than 20 nanometers, no greater than 15 nanometers, or no greater than 10 nanometers. The nanoparticle can have an average particle size of at least 1 nanometer, at least 5 nanometers, at least 15 nanometers, at least 20 nanometers, at least 25 nanometers, at least 50 nanometers, or at least 75 nanometers.

Various nanoparticles are commercially available. Commercial sources of nanoparticles are available from Nyacol Co., Ashland, Mass., Solvay-Rhodia (Lyon, France), and Nalco Co., Naperville, Ill. Nanoparticles can also be made using techniques known in the art. For example, zirconia nanoparticles can be prepared using hydrothermal technology, as described for example in PCT Publication No. WO2009/085926 (Kolb et al.). Suitable zirconia nanoparticles are also described in, for example, U.S. Pat. No. 7,241,437 (Davidson et al.).

In some embodiments, the nanoparticles may be in the form of a colloidal dispersion. Colloidal silica nanoparticles in a polar solvent are particularly desirable. Silica sols in a polar solvent such as isopropanol are available commercially under the trade names ORGANOSILICASOL IPA-ST-ZL, ORGANOSILICASOL IPA-ST-L, and ORGANOSILICASOL IPA-ST from Nissan Chemical Industries, Ltd., Chiyoda-Ku Tokyo, Japan.

Preferably, the nanoparticles are dispersed in a curable coating composition of the present disclosure. If used, nanoparticles are typically present in a curable coating composition in an amount of at least 5 wt-%, based on the total weight of the composition. If used, nanoparticles are typically present in a curable coating composition in an amount of no greater than 80 wt-%, or no greater than 50 wt-%, based on the total weight of the composition. Depending on the particle size of the nanoparticles and the amount of nanoparticles added, certain compositions may be hazy. For example, a composition that includes over 50 wt-% of 10 nanometer nanoparticles may be hazy, but such composition can be useful for certain applications.

A coating composition that includes a curable silsesquioxane polymer, a photoinitiator, and optional nanoparticles, can also include an optional organic solvent, if desired. Useful solvents for the coating compositions include those in which the compound is soluble at the level desired. Typically, such organic solvent is a polar organic solvent. Exemplary useful polar solvents include, but are not limited to, ethanol, isopropanol, methyl ethyl ketone, methyl isobutyl ketone, dimethylformamide, and tetrahydrofuran. These solvents can be used alone or as mixtures thereof.

Any amount of the optional organic solvent can be used. For example, the curable coating compositions can include up to 50 wt-% or even more of organic solvent. The solvent can be added to provide the desired viscosity to the coating composition. In some embodiments, no solvent or only low levels (e.g., up to 10 wt-%) of organic solvent is used in the curable coating composition.

The coating composition is typically a homogeneous mixture (e.g., of just the curable silsesquioxane polymer and photoinitiator) that has a viscosity appropriate to the application conditions and method. For example, a material to be brush or roller coated would likely be preferred to have a higher viscosity than a dip coating composition. Typically, a coating composition includes at least 5 wt-%, of the polymer, based on the total weight of the coating composition. A coating composition often includes no greater than 80 wt-%, of the polymer, based on the total weight of the coating composition.

A wide variety of coating methods can be used to apply a composition of the present disclosure, such as brushing, spraying, dipping, rolling, spreading, and the like. Other coating methods can also be used, particularly if no solvent is included in the coating composition. Such methods include knife coating, gravure coating, die coating, and extrusion coating, for example.

A curable coating composition of the present disclosure can be applied in a continuous or patterned layer. Such layer can be disposed on at least a portion of at least one surface of the substrate. If the curable composition includes an organic solvent, the coated curable composition can be exposed to conditions that allow the organic solvent to evaporate from the curable composition before UV curing the curable composition. Such conditions include, for example, exposing the composition to room temperature, or an elevated temperature (e.g., 60° C. to 70° C.).

Curing of a curable composition of the present disclosure can be accomplished by exposure to UV radiation or by heating (e.g. to a temperature ranging from about 50 to 120°

C. in the case of thermal curing. Typically, the curing occurs for a time effective to render the coating sufficiently non-tacky to the touch.

In some embodiments, the pencil hardness after curing is at least 3B, B, HB, H, 2H, or 3H. In some embodiments, the pencil hardness is no greater than 6H, 5H, or 4H.

The substrate on which the coating can be disposed can be any of a wide variety of hard or flexible materials. Useful substrates include ceramics, siliceous substrates including glass, metal, natural and man-made stone, and polymeric materials, including thermoplastics and thermosets. Suitable materials include, for example, poly(meth)acrylates, polycarbonates, polystyrenes, styrene copolymers such as styrene acrylonitrile copolymers, polyesters, polyethylene terephthalate.

The following is a list of illustrative embodiments of the present disclosure.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Materials

Unless otherwise noted, all parts, percentages, ratios, etc., in the examples and in the remainder of the specification are by weight. Unless otherwise noted, all chemicals were obtained or are available from, chemical suppliers such as Aldrich Chemical Company, Milwaukee, Wis.

| Designation | Description | Supplier |
|---|---|---|
| Monomer-1 | Vinyltriethoxysilane | Gelest, Inc., Morrisville, PA |
| Monomer-2 | Phenytrimethoxysilane | |
| Monomer-3 | Methyltriethoxysilane | |
| Monomer-4 | Nonafluorohexyltriethoxysilane | |
| Monomer-5 | Glycidoxypropyltriethoxysilane | |
| Monomer-6 | Triethoxysilane | |
| Karstedt catalyst | Bis(1,3-divinyl-1,1,3,3-tetrametyldisiloxane) platinum(0); 2 wt % platinum in xylene | |
| CAP-1 | Hexamethyldisiloxane | |
| CAP-2 | Ethoxytrimethylsilane | |
| "IRGACURE 184" | 1-Hydroxy-cyclohexyl-phenylketone | BASF Corp., Florham Park, NJ |
| "IPA-ST-ZL" | Colloidal silica sol, 70-100 nm particle size, 30 wt-% in IPA, commercially available under trade designation "ORGANOSILICASOL IPA-ST-ZL" | Nissan Chemical Industries, Ltd., Chiyoda-Ku Tokyo, Japan |
| "IPA-ST-L" | Colloidal silica sol, 40-50 nm particle size, 30 wt-% in IPA, commercially available under trade designation "ORGANOSILICASOL IPA-STL" | |
| "IPA-ST" | Colloidal silica sol, 10-15 nm, particle size, 30 wt-% in IPA, commercially available under trade designation "ORGANOSILICASOL IPA-ST" | |
| IPA | Iso-propanol | Sigma-Aldrich Chemical Company, St. Louis, MO |
| MEK | Methyl ethyl ketone | |
| Tartaric acid | 2,3-dihydroxybutanedioic acid | |
| Heptanes | Mixture of liner and branched heptanes | |
| "3SAB PET" | 2-mil (0.058 millimeter (mm)) thick polyester terephthalate (PET) film, which has one side chemically treated or primed to improve the adhesion of silicone coatings, commercially available under the trade designation "HOSTAPHAN 3SAB" | Mitsubishi Polyester Film, Greer, SC |
| "Syl-Off 7048" | Said to comprise "100% polymethylhydrosiloxane" and obtained from under the trade designation "Syl-Off 7048" | Dow Corning Corporation, Midland, Michigan |

Test Methods
Procedure for the Calculation of (%) OH Groups by FTIR

The amount of —OH groups present in the samples prepared according to the EX1 and CE1, described below, was determined as follows. About 0.1 g of poly(vinylsilsesquioxane) was applied as uniform thin layer directly on to a dried potassium bromide pellet and thereafter directly was analyzed by Fourier Transform Infrared Spectroscopy (FTIR), (Model Nicolet 6700 FTIR, from Thermo Fisher Scientific, Madison, Wis.). Using integration software ("OMNIC" software version 7.3, obtained from Thermo Fisher Scientific, Madison, Wis.), the total peak area from 500 $cm^{-1}$ to 4000 $cm^{-1}$ was calculated along with the area of the broad —OH absorbance peak from 3100 to 3600 $cm^{-1}$. The % OH was calculated by taking area of the —OH absorbance peak versus the total peak area.

Method for Pencil Hardness

ASTM D3363-05(2011)e2 "Standard Test Method for Film Hardness by Pencil Test" (available from ASTM International, West Conshohocken, Pa.) was used to ascertain the hardness of the cured films prepared according to the examples and comparative examples described below. Apparatus used in this study was ELCOMETER 3086 Scratch Boy (obtained from Elcometer Instruments Limited, MI). Pencil hardness was measured by moving a pencil of a designated hardness grade (i.e., 9B, 8B, 7B, 6B, 5B, 4B, 3B, 2B, B, HB, F, H, 2H, 3H, 4H, 5H, 6H, 7H, 8H, 9H, from the softest grade to hardest grade pencil), and thereafter looking at the surface under a microscope to find if the surface was scratched. The sample was designated a hardness value corresponding to the hardest pencil that did not microscopically scratch the surface of the sample.

Method for Thermogravimetric Analysis (TGA)

TGA analysis of the polymers was conducted on TGA 2950 Thermogravimetric Analyzer from TA Instruments, New Castle, De. by ramping (rate of ramp-10° C./minute) the temperature of the pan with about 8-10 mg of polymer to 600° C. The weight loss of the polymer was recorded with respect to temperature ramp.

Example 1 (EX1)

For EX1, Monomer 1 (100 g; 0.52 moles), distilled water (50 g), and tartaric acid (1.0 g) were mixed together at room temperature in a 500 mL round bottom flask equipped with a condenser. The mixture was stirred at room temperature, after 20 minutes of stirring an exotherm was observed; thereafter the temperature was maintained at 70° C. for 3-4 hrs. CAP-1 (50 g) or CAP-2 (80 g) was added to the reaction mixture followed by the stirring at 70° C. for 3 hrs to convert the silanol groups to trialkylsilyl (i.e. trimethylsilyl) groups. Evaporation of the solvents (water/ethanol mixture) yielded vinylsilsesquioxane as viscous liquid, which was dissolved in heptanes (200 mL). The heptanes solution was passed through 1-micron filter paper leading to the separation of insoluble tartaric acid. The evaporation of heptanes at 100° C. and under reduced pressure yielded a gummy liquid.

For comparative example CE1; Monomer 1 (100 g; 0.52 moles), distilled water (50 g), and tartaric acid (1.0 g) were mixed together at room temperature in a 500 mL round bottom flask equipped with a condenser. The mixture was stirred at room temperature, after 20 minutes of stirring an exotherm was observed; thereafter the temperature was maintained at 70° C. for 5-6 hrs. Evaporation of the solvents (water/ethanol mixture) yielded vinylsilsesquioxane as viscous liquid, which was dissolved in heptanes (200 mL). The heptanes solution was passed through 1-micron filter paper leading to the separation of insoluble tartaric acid. The evaporation of heptanes at 100° C. and under reduced pressure yielded vinylsilsesquioxane as gummy liquid.

EX2-EX9 copolymers were prepared in the same manner as EX1, except using their respective monomers listed in Table 1, below.

TABLE 1

| Example | Monomers and amounts | Silsesquioxane | Physical state |
|---|---|---|---|
| EX2 | Monomer 1 (100 g; 0.52 moles) Monomer 2 (104 g; 0.51 moles) | Trimethyl silyl Vinyl-co-phenyl silsesquioxane | Tacky liquid |
| EX3 | Monomer 1 (100 g; 0.52 moles) Monomer 3 (100 g; 0.56 moles) | Trimethyl silyl Vinyl-co-methyl silsesquioxane | Tacky liquid |
| EX4 | Monomer 1 (50 g; 0.26 moles) Monomer 3 (100 g; 0.56 moles) | Trimethyl silyl Vinyl-co-methyl silsesquioxane | Tacky liquid |
| EX5 | Monomer 1 (50 g; 0.26 moles) Monomer 4 (10 g; 0.048 moles) | Trimethyl silyl Vinyl-co-nonafluorohexyl silsesquioxane | Tacky liquid |
| EX6 | Monomer 1 (100 g; 0.52 moles) Monomer 5 (50 g; 0.18 moles) | Trimethyl silyl Vinyl-co-glycidoxypropyl silsesquioxane | Tacky liquid |
| EX7 | Monomer 1 (50 g; 0.26 moles) Monomer 5 (50 g; 0.18 moles) | Trimethyl silyl Vinyl-co-glycidoxypropyl silsesquioxane | Tacky liquid |
| EX8 | Monomer 1 (100 g; 0.52 moles) Monomer 6 (16.4 g; 0.10 moles) | Trimethyl silyl Vinyl-co-hydrosilsesquioxane | Tacky liquid |
| EX9 | Monomer 1 (100 g; 0.52 moles) Monomer 6 (8.2 g; 0.05 moles) | Trimethyl silyl Vinyl-co-hydrosilsesquioxane | Tacky liquid |

Examples 10-16 (EX10-EX16)

For EX10, 30 g of EX1 was dissolved in heptanes/MEK (70:30) (100 g) mixture followed by the addition of IRGA-CURE 184 (0.3 g). Using #8 Mayer Rod, the mixture was then coated on a 3SAB PET film. The coated film was passed through a "LIGHT HAMMER 6" UV-chamber (obtained from Fusion UV Systems, Inc., Gaithersburg, Md., under trade designation "LIGHT HAMMER 6") equipped with an H-bulb 15 located at 5.3 cm above sample at 12 meters/minute to cure the coating. The coating was cured to touch and adhered well to PET film.

EX11-EX13 were prepared in the same manner as EX10, except that the corresponding coating mixtures further contained 40 g of IPA-ST-L, 60 g of IPA-ST, and 10 g of IPA-ST-ZL, respectively. The EX11-EX13 samples were cured to touch and adhered well to PET film.

EX14-EX16 were prepared in the same manner as EX10, except that the copolymers used were varied as summarized in Table 2, below.

TABLE 2

| Example | Silsesquioxane |
|---|---|
| EX14 | Trimethyl silyl Vinyl-co-methyl silsesquioxane |
| EX15 | Trimethyl silyl Vinyl-co-nonafluorohexyl silsesquioxane |
| EX16 | Trimethyl silyl Vinyl-co-glycidoxypropyl silsesquioxane |

Examples 17-19 (EX17-EX19)

For EX17, 30 g of the material prepared in EX1 was dissolved in heptanes/MEK (70:30) (100 g) mixture followed by the addition of "Syl-Off 7048" (1 g) and Karstedt Catalyst (200 ppm Pt with respect to total solids). Using #8 Mayer Rod, the mixture was then coated on a 3SAB PET film. The coated layer was cured at 110° C. for 60 seconds in an oven equipped with solvent exhaust. The coating was cured to touch and adhered well to PET film.

For EX18, 30 g of the material prepared in EX8 was dissolved in heptanes/MEK (70:30) (100 g) mixture followed by the addition of Karstedt Catalyst (200 ppm Pt with respect to total solids). Using #8 Mayer Rod, the mixture was then coated on a 3SAB PET film. The coated layer was cured at 110° C. for 60 seconds in an oven equipped with solvent exhaust. The coating was cured to touch and adhered well to PET film. For EX19, the material prepared in EX9 was cured using the same process as described in EX18.

For EX20, the material prepared in CE1 was cured using the same process as described in EX17.

Method for Peel Adhesion Measurement

Poly(vinylsilsesquioxane) (50 wt-% solution in methyl ethyl ketone) samples prepared according to EX1 and CE1, described below, were coated on 3SAB PET films using a knife coater to provide a dry coating having a thickness of 2-3 mil (0.058-0.076 mm). The coated PET films were placed in a forced air drying oven maintained at 70° C. (for 2 minutes) to evaporate the solvent. After drying, the coated PET films were cut into samples for measuring peel adhesion according to the method described below.

Peel adhesion of EX1 and CE1 samples was then measured with an IMASS SP-2000 peel tester (obtained from IMASS, Inc., Accord, Mass.) using 0.5 inch by 5 inch (about 1.25 cm by 12.7 cm) samples. The samples were applied to a clean glass panel using four total passes of a 2 kg-rubber roller. Prior to testing, the samples were allowed to dwell for 20 minutes at room temperature and 50 percent relative humidity. The panel was then mounted on the IMASS SP-2000 peel tester, and the samples were pulled off of the panel at a 90 degree angle at a speed of 30.48 cm/minute. Peel force was measured in units of ounces per inch (oz/inch) and was used to calculate the average peel force for a minimum of three samples and was then converted to Newtons per decimeter (N/dm).

Peel Adhesion & —OH Content

| Example | Peel Force (N/dm) | —OH groups (%) |
|---|---|---|
| 1 | 2.0 | 1.3 |
| 2 | 1.5 | 1.8 |
| 3 | 1.7 | 0.8 |
| 4 | 1.5 | 0.5 |
| 5 | 1.2 | 0.7 |

Pencil Hardness

| Example | Pencil Hardness |
|---|---|
| 10 | 1H |
| 11 | 3H |
| 12 | 3H |

TGA

FIG. 1 depicts a TGA curve was recorded on TA Instrument™ under ambient conditions and by ramping the temperature from 40-600° C. at 10° C./minute. As is evident from TGA curve, EX1 showed significantly better thermal stability relative to comparative example CE-1.

Example 21

The SSQ material of Example 1 (SSQ-1, 5 g) and vinyl terminated polydimethylsiloxane available from Gelest, Inc., Morrisville, Pa. under the trade designation "DMS-V00" (5 g) were dissolved in 100 g of heptanes/methylethyl ketone mixture (50/50) followed by the addition of IRGACURE 184 (0.3 g) to form a coatable mixture. Using a #8 MAYER ROD, the coatable mixture was then coated onto a 2-mil (0.058 millimeter (mm)) thick 3SAB PET film. The coated film was passed at 12 meters/minute through a UV-chamber (obtained from Fusion UV Systems, Inc., Gaithersburg, Md., under trade designation "LIGHT HAMMER 6") equipped with an H-bulb located 5.3 cm above the sample. The coating was cured to touch.

Examples 22-31

Examples 22-31 were made and cured in the same manner as Example 21, utilizing the kinds and amounts of materials indicated in the following table. These coatings were also cured to touch.

| Ex. # | SSQ Material (Amount in grams) | Polymer Material (Amount in grams) |
|---|---|---|
| 22 | SSQ of Ex. 1 (2 g) | polydimethylsiloxane available from Gelest, Inc., under the trade designation "DMS-V00" (5 g) |
| 23 | SSQ of Ex. 1 (2 g) | polydimethylsiloxane available from Gelest, Inc., under the trade designation "DMS-V03" (5 g) |
| 24 | SSQ of Ex. 1 (2 g) | polydimethylsiloxane available from Gelest, Inc., under the trade designation "DMS-V05" (5 g) |
| 25 | SSQ of Ex. 1 (2 g) | polydimethylsiloxane available from Gelest, Inc., under the trade designation "DMS-V35" (5 g) |
| 26 | SSQ of Ex. 1 (2 g) | Vinylmethylsiloxane available from Gelest, Inc., under the trade designation "VMS-T11" (5 g) |
| 27 | SSQ of Ex. 1 (1 g) | Vinylmethylsiloxane available from Gelest, Inc., under the trade designation "VMS-T11" (5 g) |

-continued

| Ex. # | SSQ Material (Amount in grams) | Polymer Material (Amount in grams) |
|---|---|---|
| 28 | SSQ of Ex. 1 (5 g) | Vinylmethylsiloxane available from Gelest, Inc., under the trade designation "VMS-T11" (5 g) |
| 29 | SSQ of Ex. 1 (1 g) | Methacryloxypropyl terminated polydimethylsiloxane available from Gelest, Inc., under the trade designation "DMS-R05" (5 g) |
| 30 | SSQ of Ex. 1 (0.5 g) | Methacryloxypropyl terminated polydimethylsiloxane available from Gelest, Inc., under the trade designation "DMS-R05" (5 g) |
| 31 | SSQ of Ex. 1 (0.25 g) | Methacryloxypropyl terminated polydimethylsiloxane available from Gelest, Inc., under the trade designation "DMS-R05" (5 g) |

What is claimed is:

1. A curable composition comprising a photoinitiator and a curable silsesquioxane polymer comprising a three-dimensional branched network having the formula:

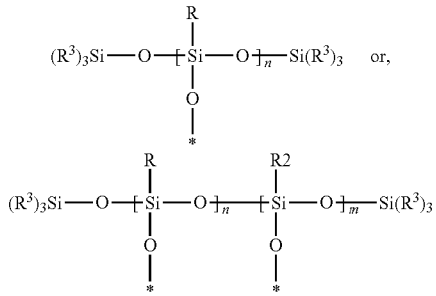

wherein:

the oxygen atom at the * is bonded to another Si atom within the three-dimensional branched network;

R is an organic group comprising an ethylenically unsaturated group selected from vinyl and alkenyl;

R2 is an organic group that is not an ethylenically unsaturated group;

$R^3$ is a non-hydrolyzable group; and n or n+m is an integer of greater than 3; wherein the curable silsesquioxane polymer comprises a hydrosilylation catalyst, and optionally a polyhydrosiloxane crosslinker.

2. The curable composition of claim 1 wherein $R^3$ is independently selected from alkyl, aryl, aralkyl, alkaryl, optionally comprising substituents.

3. The curable composition of claim 1 wherein the polymer further comprises OH groups present in an amount of no greater than 5 wt-% of the silsesquioxane polymer.

4. The curable composition of claim 1 wherein the silsesquioxane polymer is free of OH groups.

5. The curable composition of claim 1 wherein n is an integer of no greater than 200.

6. The curable composition of claim 1 wherein R has the formula Y—Z, wherein Y is the depicted covalent bond or a group selected from alkylene, arylene, alkarylene, and araalkylene; and Z is an ethylenically unsaturated group selected from a vinyl group and an alkenyl group.

7. The curable composition of claim 1 wherein R2 has the formula Y—X, wherein Y is the depicted covalent bond or a group selected from alkylene, arylene, alkarylene, and aralkylene; and X is hydrogen, alkyl, aryl, alkaryl, aralkyl; or a reactive group that is not an ethylenically unsaturated group.

8. The curable composition of claim 6 wherein Y is a (C1-C20)alkylene group, a (C6-C12)arylene group, a (C6-C12)alk(C1-C20)arylene group, or a (C6-C12)ar(C1-C20) alkylene group.

9. The curable composition of claim 1 which has peel force from glass of at least 1 N/dm.

10. The curable composition of claim 1 further comprising nanoparticles, organic solvent, or a mixture thereof.

11. An article comprising a substrate and the curable composition of claim 1 in a layer disposed on at least a portion of at least one surface of the substrate.

12. An article comprising a substrate and a cured coating layer prepared by UV curing the composition of claim 1 disposed on at least a portion of at least one surface of the substrate.

13. An article comprising a substrate and a cured coating layer prepared by thermal curing the composition of claim 1 disposed on at least a portion of at least one surface of the substrate.

14. The curable silsesquioxane polymer of claim 1 wherein the curable polymer has a weight loss of less than 90% at 200° C.

15. The curable composition of claim 1 further comprising at least one monomer, oligomer, or polymer comprising ethylenically unsaturated groups.

16. The curable composition of claim 15 wherein the ethylenically unsaturated groups of the monomer, oligomer, or polymer are (meth)acrylate, vinyl, or a combination thereof.

17. The curable composition of claim 15 wherein the monomer, oligomer, or polymer is a siloxane containing monomer, oligomer or polymer.

18. The curable composition of claim 15 wherein the siloxane containing polymer comprises vinyl or (meth) acrylate groups.

19. The curable composition of claim 1 wherein and n and m are selected such that the copolymer comprises at least 25 mol % of repeat units comprising R.

* * * * *

UNITED STATES PATENT AND TRADEMARK OFFICE
CERTIFICATE OF CORRECTION

PATENT NO. : 10,066,123 B2
APPLICATION NO. : 15/102809
DATED : September 4, 2018
INVENTOR(S) : Jitendra Rathore et al.

Page 1 of 1

It is certified that error appears in the above-identified patent and that said Letters Patent is hereby corrected as shown below:

In the Specification

Column 7
Line 17, delete "alkyarylene," and insert -- alkylarylene, --, therefor.

Column 14
Line 67, Delete "wt-%" and insert -- wt-%. --, therefor.

Column 15
Lines 19-20, delete "tetrametyldisiloxane" and insert -- tetramethyldisiloxane --, therefor.

Column 18
In the table description for Karstedt catalyst, delete "tetrametyldisiloxane" and insert -- tetramethyldisiloxane --, therefor.

In the Claims

Column 24
Line 63, In Claim 19, delete "and n and" and insert -- n and --, therefor.

Signed and Sealed this
Seventh Day of May, 2019

Andrei Iancu
*Director of the United States Patent and Trademark Office*